June 24, 1924.

H. A. ELLER

JOINT

Filed Nov. 3, 1922

1,499,298

Inventor
Henry A. Eller
By Clarence S. Walker.
His Attorney

Patented June 24, 1924.

1,499,298

UNITED STATES PATENT OFFICE.

HENRY A. ELLER, OF CELORON, NEW YORK, ASSIGNOR TO AUTO SPRING CONTROL COMPANY, INC., OF JAMESTOWN, NEW YORK, A CORPORATION OF NEW YORK.

JOINT.

Application filed November 3, 1922. Serial No. 598,931.

*To all whom it may concern:*

Be it known that I, HENRY A. ELLER, a citizen of the United States, residing at Celoron, in the county of Chautauqua and State of New York, have invented certain new and useful Improvements in Joints, of which the following, taken in connection with the accompanying drawings, is a specification.

This invention relates to an improvement in a joint and more particularly in a joint of the ball and socket type in which the inner member has a spherical surface which is enclosed by a spherical chamber in the outer member.

The object of this invention is to provide a joint of the above type in which the engagement contact between the members can be adjusted to eliminate lost motion, in which the contacting members are held in engagement by a spring and which is so formed that no moisture can enter between the contacting surfaces.

Other objects will appear from the consideration of the following description taken in connection with the drawings which form a part thereof and in which Figure 1 is a longitudinal cross section of a joint embodying this invention.

Figure 1:
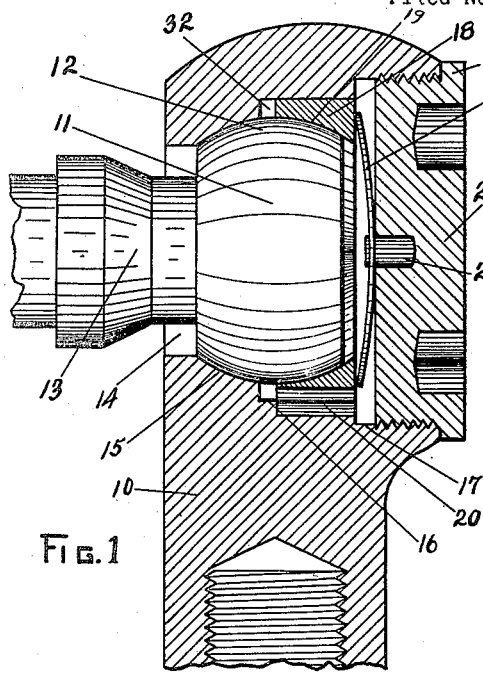
Figure 2:
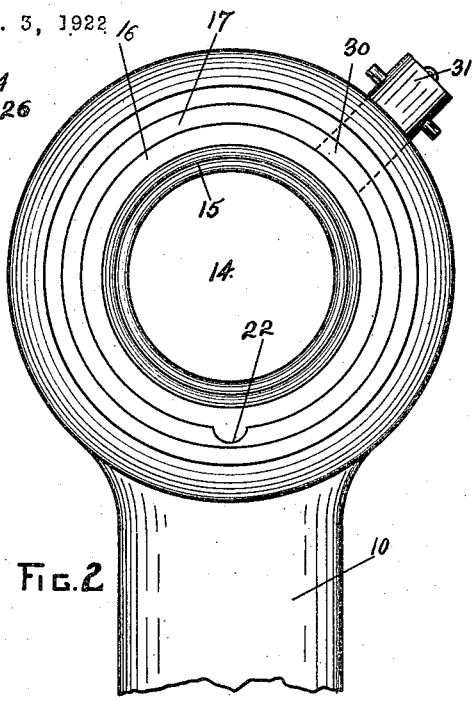
Fig. 2 is a front view of the outer member.
Figure 3:
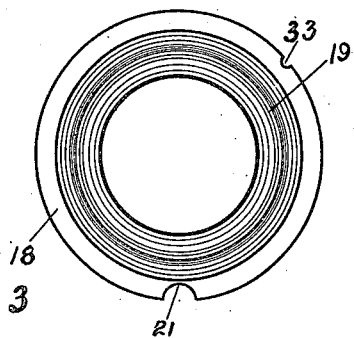
Fig. 3 is a front elevation of a removable race.
Figure 4:
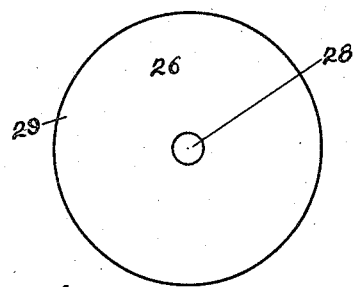
Fig. 4 is a plan view of a spring plate.
Figure 5:
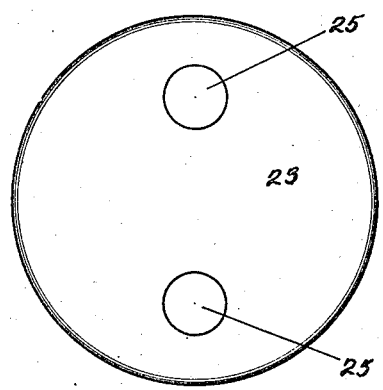
Fig. 5 is an elevation of the cover plate.

Referring to the drawings the reference numeral 10 is used to designate the outer joint member and the reference numeral 11 the inner joint member. The member 11 has a spherical head 12 carried on a shank 13 and the member 10 has a socket 14 open at each end into which the head 12 and shank 13 of the member 11 project. Adjacent one end of the socket 14 is formed an annular curved surface 15, adjacent the other end is formed an annular threaded surface 17 of greater diameter, and between these surfaces is formed an annular surface 16, the diameter of which is intermediate that of the surfaces 15 and 17. Within the socket 14 and resting upon the surface 16 is arranged a removable race or ring 18 the inner surface 19 of which has the same curvature as the surface 15. The curvature of the surfaces 15 and 19 is the same as that of the spherical surface of the head 12, so that when the parts are assembled, as shown in Fig. 1, the head will be between the surfaces 15 and 19 and can move freely thereover. The ring 18 is held against rotation relative to the member 10 by means of a pin 20, which engages a notch 21 in the ring 18 and a notch 22 in the surface 16 of the member 10.

The cover plate 23 is externally threaded to engage with the threaded surface 17 of the socket 14 and has an overhanging annular flange 24 which, when the parts are properly assembled, bears against the outer face of member 10 in order to close and seal that end of the socket. Spaced pockets 25 are provided on the outer face of the cover for the projecting pins of a spanner (not shown) by which the cover is turned.

Carried by a pin 27 projecting from the inner face of the cover 23 is a spring plate 26 which has a center aperture 28 through which the pin 27 passes to hold the spring plate in position. The plate 26 is cupped so that its perimeter 29 bears against the outer face of the ring 18 thus holding it at all times in contact with the head 12.

By reason of the close contact between the portion 15 of the member 10 and the spherical face of the head 12 no dirt can enter. An oiling passage 30 is provided in the member 10 terminating in the surface 16. In the present embodiment this oiling passage 30 is shown provided with an alemite lubrication. The lubricant forced through the passage 30 enters the space 32 between the portion 15 and the ring 18 and falls directly upon the spherical surface of the head 12 from which it works between the head 12 and the surfaces 15 and 19. This spreading of lubricant from the center of the head to the edges results in forcing the lubricant out at the exposed edges thus providing an intact lubricating film between the engaging surfaces and preventing the entrance of dirt or grit.

In order to insure that the space between the head 12 and cover 23 is filled with lubricant a transverse groove 33 is provided in the edge of the race 18 preferably adjacent the inner end of the lubricator 31. The lubricant will not only be forced into the space 32 but through the groove 33 so that the head 12 will be completely packed with lubricant.

Upon tightening of the cover 23 the spring plate 26 forces the ring 18 against the head 12 and causes the latter to seat firmly upon the surface 15. Consequently any lost motion in the joint will be taken up and the movement of the head 12 in the socket 14 can be adjusted.

While one embodiment of this invention has been shown and described, I am not to be limited thereto since it is obvious that others may be made without departing from the spirit and scope of the invention as set forth in the following claim.

Having thus set forth my invention, what I claim as new and for which I desire the protection of Letters Patent:

A ball and socket joint comprising a member having a spherically shaped head, and a second member having a socket therein, open at both ends, an annular curved surface in said socket against which said head seats, a movable race in said socket having a curved face bearing upon said head, a cover for one end of said socket, a pin carried by the inner face of the cover, and a cupped spring on said pin bearing at its perimeter upon said race to hold it against said head.

In testimony whereof I have affixed my signature.

HENRY A. ELLER.